(12) United States Patent
Wifvesson et al.

(10) Patent No.: US 9,467,433 B2
(45) Date of Patent: Oct. 11, 2016

(54) AUTHENTICATION OF WARNING MESSAGES IN A NETWORK

(75) Inventors: Monica Wifvesson, Lund (SE); Michael Liljenstam, Solna (SE); John Mattsson, Täby (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 14/130,166

(22) PCT Filed: Jun. 14, 2012

(86) PCT No.: PCT/EP2012/061318
§ 371 (c)(1),
(2), (4) Date: Dec. 30, 2013

(87) PCT Pub. No.: WO2013/004465
PCT Pub. Date: Jan. 10, 2013

(65) Prior Publication Data
US 2014/0150064 A1    May 29, 2014

Related U.S. Application Data

(60) Provisional application No. 61/503,806, filed on Jul. 1, 2011.

(51) Int. Cl.
*H04L 29/06* (2006.01)
*H04W 12/10* (2009.01)
*H04W 4/22* (2009.01)

(52) U.S. Cl.
CPC ............. *H04L 63/08* (2013.01); *H04L 63/123* (2013.01); *H04W 12/10* (2013.01); *H04W 4/22* (2013.01)

(58) Field of Classification Search
CPC ..... H04L 63/08; H04L 63/128; H04L 63/10; H04L 63/00; H04W 12/10; H04W 4/22
USPC .......................................................... 726/3
See application file for complete search history.

(56) References Cited

U.S. PATENT DOCUMENTS

| 2002/0013831 A1* | 1/2002 | Astala et al. ................. 709/220 |
| 2002/0021696 A1* | 2/2002 | Minborg ....................... 370/392 |
| 2010/0003945 A1* | 1/2010 | Primo et al. ............... 455/404.1 |

FOREIGN PATENT DOCUMENTS

| CN | 1820481 A | 8/2006 |
| CN | 101142784 A | 3/2008 |

(Continued)

OTHER PUBLICATIONS

Unknown, Author. "3rd Generation Partnership Project; Technical Specification Group Services and System Aspects; Public Warning System (PWS) requirements (Release 11)." 3GPP TS 22.268 V11. 1.0. Mar. 2011.

(Continued)

*Primary Examiner* — William Goodchild
(74) *Attorney, Agent, or Firm* — Murphy, Bilak & Homiller, PLLC

(57) ABSTRACT

There is described herein a device (101) for communicating with a network. The device (101) comprises a communications unit for receiving data, a notification device for providing a notification to a user, and a control unit for controlling the operation of the communications unit and notification unit. The communications unit is configured to receive an information message (110, 112, 115), and to receive security authentication data (110, 112, 115) associated with the information message if such security authentication data is available. The control unit is configured to operate in a first or second configuration. In the first configuration it ignores the security authentication data, (111, 113), and instructs the notification unit to convey the notification to the user. In the second configuration, it verifies the information message (116) on the basis of the security authentication data and instructs the notification unit to convey the notification to the user if the verification is successful. The communications unit is configured to receive a configuration message (114) indicating the configuration in which the control unit should operate, and the control unit is configured to change configuration if the indicated configuration is different to the current configuration.

19 Claims, 11 Drawing Sheets

(56) References Cited

FOREIGN PATENT DOCUMENTS

| WO | 2006098552 A1 | | 9/2006 |
|---|---|---|---|
| WO | 2007110094 A1 | | 10/2007 |
| WO | WO 2010118571 A1 | * | 10/2010 |

OTHER PUBLICATIONS

Unknown, Author. "Security Features of PWS." Huawei, HiSilicon. S3-110365. 3GPP TSG-SA3 (Security) SA3#63. Apr. 11-15, 2011. ChengDu, China.

3GPP, "3rd Generation Partnership Project; Technical Specification Group Core Network and Terminals; Technical realization of Cell Broadcast Service (CBS) (Release 11)", 3GPP TS 23.041 V11.0.0, Dec. 2010, 1-48.

3GPP, "3rd Generation Partnership Project; Technical Specification Group Services and System Aspects; 3G Security; Security of Multimedia Broadcast/Multicast Service (MBMS) (Release 10)", 3GPP TS 33.246 V10.0.0, Dec. 2010, 1-68.

3GPP, "3rd Generation Partnership Project; Technical Specification Group Services and System Aspects; 3GPP System Architecture Evolution (SAE); Security architecture (Release 11)", 3GPP TS 33.401 V11.0.1, Jun. 2011, 1-115.

Unknown, Author, "Security aspects of Public Warning System", 3GPP TSG-SA3 (Security), S3-110565, SA3#63, ChengDu, China, Apr. 11-15, 2011, 1-4.

* cited by examiner

AUTHENTICATION OF WARNING MESSAGES IN A NETWORK

TECHNICAL FIELD

The present invention relates to a method and apparatus for authenticating warning messages in a network. In particular, the invention relates to a method for configuring an authentication system.

BACKGROUND

Well known technologies exist for broadcast of messages to users in cellular networks and to provide authenticity and integrity protection for such messages. The combination of integrity protection and authentication will be referred to hereinafter as authentication or message authentication. Examples of such systems include the Multicast Broadcast Multimedia System (MBMS) specified by 3GPP (TS 33.246), Cell Broadcast System (CBS) (TS 23.041 v11.0.0 and TS 23.401 v10.4.0), and the Public Warning System (PWS) for which security is currently being specified (http://www.3gpp.org/ftp/tsg sa/WG3 Security/TSGS3 63 Chengdu/Docs/S3-110565.zip).

In a broadcast setting, source origin authentication is necessary. This is usually achieved by adding a public key digital signature of the message to the message. Examples of other mechanisms used include those based on pre-shared keys, and on hash-chains (e.g. IETF RFC 4082).

When a public key digital signature is added to the message, the receiver can verify that the signature is correct and hence deduce that the received message is also correct. The receiver may further deduce that the message originates from the sender claiming to be the origin of the message.

Security features such as message authentication are normally handled by a two stage process by security protocols. In a first negotiation phase, traffic is not protected between the sender and the receiver. During this phase, the sender and receiver agree on which security features are supported by each side. They negotiate which of these security features are to be used, together with possible parameters to configure each chosen security feature. For example, if a signature is to be added to a message, the sender and receiver could agree on which algorithm to use for the signature computation. In the simplest form of negotiation, the sender of the message informs the receiver which security feature to use. In this situation the sender will have selected the security feature and its configuration from an assumed set of supported features or from a list of features and configurations previously obtained from the receiver.

Once the security features are selected and configured, they have to be activated for messages sent from the sender to the receiver.

This can be done in several ways. One example is provided in 3G and LTE telecommunication networks as defined by 3GPP (TS 33.102 v10.0.0, TS 33.401v10.4.0). In such networks, the network sends a "security mode control message" to the terminal to instruct the terminal to start security processing of the messages. Before the security mode control message is sent the traffic is not protected. Another example is provided by IPsec (IETF RFC 4301), in which two peers run IKEv2 (RFC 4306) during the negotiation phase. When that is completed, traffic between the two peers starts to be integrity protected (if that feature was selected during the negotiation).

Typically, when communication systems are deployed it can be expected that both the sender and the receiver of a message implement the functionality needed. For example, if the sender includes some control information in a message, the receiver is expected to be able to interpret the control information and take any action associated with it.

Another option is that there may be a mechanism in which the sender and receiver agree on which functionality will be supported, and after this they only include information relating to the agreed functionality in the messages.

A third option is that receivers are able to distinguish information elements which they do understand and can ignore those for which they have no support.

Systems are often designed and released in a step by step fashion. For example some functionality may be provided in a certain release, with more functionality being added in later releases. This is how telecommunication systems defined by 3GPP are handled.

Due to time schedule and dependencies on other features, a feature is sometimes only partially specified in one release. It may then be decided to include that feature in a certain release with the intention of completing the specification in the next release. This happened to the Public Warning System ETWS (Earthquake and Tsunami Warning System).

The Public Warning System (PWS) is a system for delivery of warning messages from a telecommunication network to terminals/user equipments, such as mobile telephones, laptops, and tablets. The warnings are broadcast in certain areas. A typical type of warning is a warning about an event such as tsunami or earthquake.

In PWS a field was added which was intended to carry the signature of a warning message. However, it was never specified how this signature should be computed and verified. As a result, terminals implemented according to the current specification will receive the signature field, but the content of the field is not known to them and they cannot verify the authenticity of the message.

If the terminal completely ignores the signature field, the terminal is open to attacks. An attacker may inject false messages which the terminal will display to the user. This danger may lead to the development of a proprietary signature scheme which could then be implemented by some (but probably not all) terminals. Terminals could also be developed to interpret the signature field in some other proprietary way.

When 3GPP finally defines a signature scheme to fill the signature field and corresponding actions to be taken by terminals, those terminals using a proprietary interpretation of the signature field in the warning message are likely to deduce that the signature is invalid (because it does not follow the expected proprietary structure). This results in a risk that such terminals will discard the warning message before showing it to the user. In addition, even terminals attempting to implement the signature scheme specified by 3GPP may be incorrectly implemented and may therefore also deduce that the signature is incorrect and discard the warning message.

Since PWS is a safety critical application it is crucial that users get the information provided by the system: this may possibly be even more important than the ability of the system to provide authentication of the messages. Unfortunately, since the signature field is already included in the PWS warning messages, once the signature scheme is added to a 3GPP release, the problems with existing proprietary schemes and incorrect implementations described in the preceding paragraph will become reality. It will be noted that authentication of PWS messages is hence "always on", i.e. there is no negotiation phase which can be used to disable the feature.

SUMMARY

The object of the present invention is to alleviate the above problems.

In accordance with one aspect of the present invention there is provided a device for communicating with a network. The device comprises a communications unit for receiving data, a notification device for providing a notification to a user, and a control unit for controlling the operation of the communications unit and notification unit. The communications unit is configured to receive an information message, and to receive security authentication data associated with the information message if such security authentication data is available. The control unit is configured to operate in a first or second configuration. In the first configuration it ignores the security authentication data (if any) and instructs the notification unit to convey the notification to the user. In the second configuration, it verifies the information message on the basis of the security authentication data and instructs the notification unit to convey the notification to the user if the verification is successful. The communications unit is configured to receive a configuration message indicating the configuration in which the control unit should operate, and the control unit is configured to change configuration if the indicated configuration is different to the current configuration.

The control unit may be initially configured to operate in the first configuration in one or more of the following situations: when the device is switched on for the first time; every time the device is switched on; when the device is restarted; when the device roams to a new network; when the device has been configured via a second configuration message; and following an interruption to communication. The configuration message may indicate that the control unit should switch to the second configuration, so that from then on the notification is conveyed to the user if the information message is verified. The control unit may be configured to authenticate the configuration message.

The configuration of the control unit may be stored in a configuration storage unit associated with the device.

The communications unit may be configured to receive one or more keys (e.g. public keys), which can be stored in a key storage unit associated with the device. The control unit may be configured to use at least one of the one or more keys to verify the information message. The communications unit may be configured to receive the one or more keys before the configuration message. Alternatively, the one or more keys may be included in the configuration message, and the control unit may be configured to extract the one or more keys from the configuration message.

The configuration storage unit and/or key storage unit may be included in the device itself, or in a module such as SIM, USIM, or ISIM. Alternatively the module may be in the form of embedded UICC (eUICC) in ETSI SCP or a soft SIM implementation in a Trusted Execution Environment (TrE) also named MCIM. It could also be included in CSIM in 3GPP2. It will be appreciated that, in practice, the key storage unit and configuration storage unit may be the same entity.

The notification unit may comprise a display device, so that conveying the notification to the user may comprise displaying information contained in the information message.

The configuration message may include an indication of security information that should be displayed to the user. When an information message is received, the control unit may instruct the display device to display the security information to the user along with the information in that message in dependence on the indication in the configuration message. Such security information may include for example the security level of the message, a timestamp, the originator of the message, etc.

The information message may be a Public Warning System message.

The control unit may be configured to authenticate the configuration message.

In accordance with another aspect of the present invention there is provided a serving node for use in a telecommunications network. The serving node comprises a communications unit for sending data, a storage medium for storing data, and a control unit for controlling the operation of the communications unit and the storage medium. The communications unit is configured to send a configuration message to user devices in the network, the configuration message including an indication as to whether or not the user devices should operate in a first configuration in which security authentication data associated with information messages sent subsequent to the configuration message is not processed before a notification is conveyed to a user, or a second configuration in which the security authentication data must be processed before a notification is conveyed to the user.

The communications unit may be configured to send one or more public keys to the user devices to enable the user devices to process the security authentication data. These public keys may be sent in the configuration message.

The configuration message may includes an indication of security information that should be displayed to the user.

In accordance with another aspect of the present invention there is provided a method for activating the use of security authentication data in a user device in a telecommunications network. The method comprises receiving a configuration message and setting a configuration on the basis of an indication contained in the message. In a first configuration, received security authentication data associated with a received information message are ignored. In a second configuration, received security authentication data associated with a received information message are processed.

In accordance with another aspect of the present invention there is provided a method for operating a user device in a telecommunications network. The method comprises receiving an information message and receiving security authentication data associated with the information message if such security authentication data is available. The information message is processed in dependence on whether the device is configured in a first configuration or a second configuration. In the first configuration the security authentication data, if any, is ignored and a notification is conveyed to a user. In the second configuration the information message is verified on the basis of the security authentication data and a notification is conveyed to the user if the verification is successful. The method further comprises receiving a configuration message indicating the configuration in which the control unit should operate. The configuration is changed if the indicated configuration is different to the current configuration.

In accordance with another aspect of the present invention there is provided a method for operating a serving node in a telecommunications network, comprising sending a configuration message to user devices in the network, the configuration message including an indication as to whether or not the user devices should operate in a first configuration in which security authentication data associated with information messages sent subsequent to the configuration message is not processed before a notification is conveyed to a user, or a second configuration in which the security authentication data must be processed before a notification is conveyed to the user.

In accordance with another aspect of the invention there is provided a computer program product comprising code adapted to be executed on a device in a telecommunications network. The code is operable to cause the device to receive an information message and receive security authentication data associated with the information message if such security authentication data is available. The code is further operable to process the information message in dependence on whether the device is configured in a first configuration or a second configuration. In the first configuration the security authentication data, if any, is ignored and a notification is conveyed to a user. In the second configuration the information message is verified on the basis of the security authentication data and a notification is conveyed to the user if the verification is successful. The code is further operable to enable the device to receive a configuration message indicating the configuration in which the device should operate, and change configuration if the indicated configuration is different to the current configuration.

In accordance with another aspect of the present invention there is provided a computer program product comprising code adapted to be executed on a serving node in a telecommunications network, the code operable to cause the serving node to send a configuration message to user devices in the network, the configuration message including an indication as to whether or not the user devices should operate in a first configuration in which security authentication data associated with information messages sent subsequent to the configuration message is not processed before a notification is conveyed to a user, or a second configuration in which the security authentication data must be processed before a notification is conveyed to the user.

The invention also provides the computer program product described above, carried on a carrier medium such as RAM, ROM, EPPROM, flash memory, disk or similar.

The invention also provides a computer program comprising computer readable code which, when operated by a user device or serving node in a telecommunications network, causes the user device or serving node to carry out the methods described above. The invention further provides a computer program product comprising a computer readable medium and a computer program as just described, wherein the computer program is stored on the computer readable medium.

In line with the embodiments of the methods above, there also is a network device/network entity which comprises the configuration function that causes the network device to send the configuration message. The network device may also be adapted to send the message authentication data and/or a warning message. The message verification function and the configuration function may be computer programs which when run by the UE and the network device respectively causes them to perform the steps associated with the respective function as will be described more in detail below. The computer programs can be stored in a computer readable medium/computer program product in the form of a memory such as a ROM, RAM, EEPROM, Flash or hard disk.

BRIEF DESCRIPTION OF THE DRAWINGS

The objects, advantages and effects as well as features of the methods, UE, network node and computer programs above will be more readily understood from the following detailed description of the methods and devices as well as other embodiments when read together with the accompanying drawings, in which.

DETAILED DESCRIPTION

Figure 1:
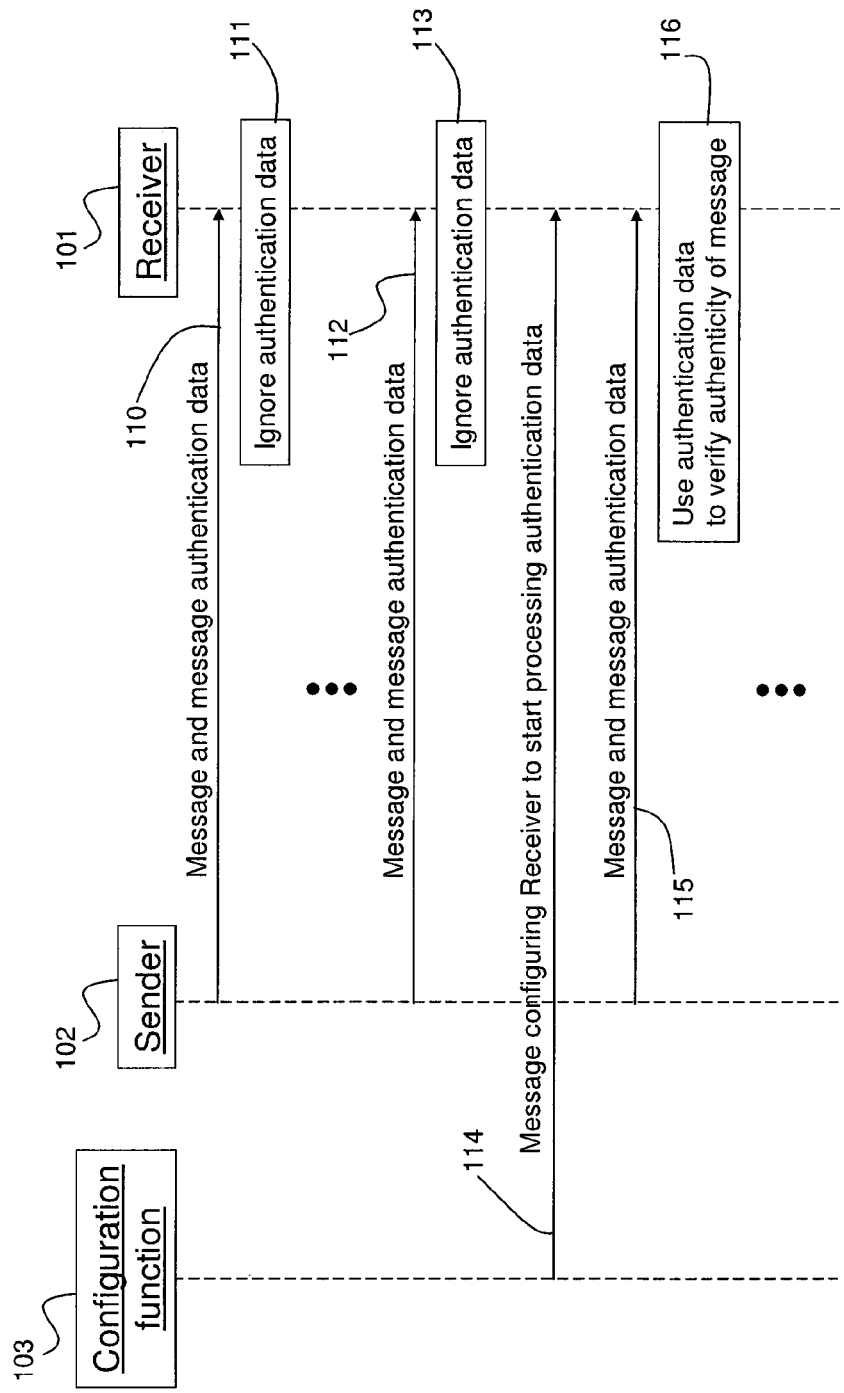
FIG. 1 is a signalling diagram illustrating a basic concept for updating the configuration of a receiver.

While the method above covers various modifications and alternative implementations (such as in sending and receiving devices in the form of user equipments (UE), computer programs and computer program products that comprises the computer programs), embodiments are shown in the drawings and will hereinafter be described in detail. However it is to be understood that the specific description and drawings are not intended to limit the general inventive idea to the specific forms disclosed.

In general terms there is described a system that enables the receiver of a message (e.g. UE/mobile terminal) to display that message (or send some other form of notification to a user) without needing to use received authentication information associated with the message to verify the authenticity of the message when the receiver is in a certain configuration. After the receiver obtains a new configuration from a configuration function, the receiver may follow the new configuration and use authentication information associated with the messages to verify the authenticity of the messages and take relevant measures depending on the verification.

FIG. 1 illustrates this in general terms. Initially (e.g. when the device is first switched on, or when it roams to a new network), a receiver (UE) 101 is in a first configuration in which it does not process authentication information. A sender (e.g. a serving node) 102 sends a message 110 and message security authentication data to the receiver. Because the receiver 102 is configured not to process security authentication data it ignores the security authentication data 111 and processes the message. This sequence may be repeated some time later, with a message 112 and authentication data being sent to the receiver 101, and the authentication data again being ignored 113 by the receiver.

At some later point in time, a configuration function (e.g. another serving node) 103 sends a configuration message 114 to the receiver, which causes the receiver to switch to a second configuration in which it processes security authentication data for all received messages from now on. The next time that the sender 102 sends a message 115 to the receiver 101, the receiver uses the authentication data to verify the authenticity of the message 116, and only present the message if the authenticity is confirmed.

Previously used schemes do not need to (and do not) include any authentication information with those messages sent before a decision is made that receivers should start using the selected security features. If the information provider were to use one of those methods in this situation, he would have to ensure that authentication information was not included with the messages transmitted before this decision is made. Legacy receivers may not be able to correctly receive, parse or use the message as intended, since they would expect the authentication information to be present.

The following description relates to an embodiment in a Public Warning System (PWS) as specified in 3GPP. However, it will be appreciated that other systems may also employ the same or similar principles.

Figure 2:
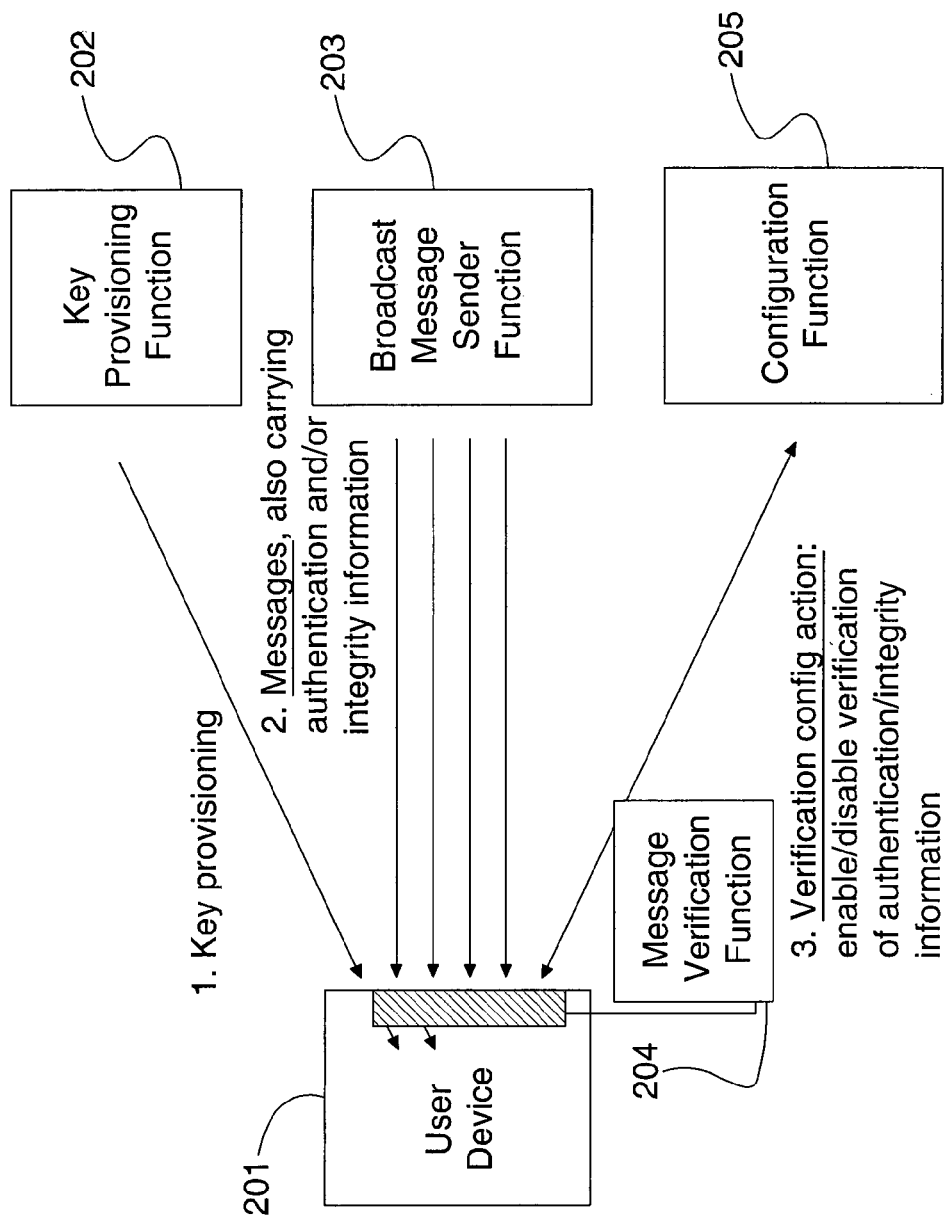
FIG. 2 is a schematic illustration of functions used to implement the method shown in FIG. 1.

FIG. 2 is a schematic illustration of a system for distributing a centrally controlled configuration for handling of one or more broadcast messages which reach a user device (UE) 201. A key provisioning function 202 provisions the user device 201 with keys for authenticating broadcast messages. The key provisioning function may be implemented in any suitable network node, for example an SGSN (Serving GPRS Support Node), MME (Mobility Management Entity), MSC (Message Switching Center), CBC (Cell Broadcast Center), NAF (Network Application Function), eNB, NodeB, RNC (Radio Network Controller), BSC (Base Station Controller). A broadcast message sender function 203 sends messages (possibly periodically) that carry authenticity information and/or integrity information. The broadcast message sender function may be implemented in any network node, such as the BTS, BSC, RNC and eNodeB. In (or associated with) the user device 201 there is a message verification function 204 configured to filter messages based on the authenticity and/or integrity information carried in the messages and the provisioned key(s). The message verification function can be implemented in the mobile equipment (ME) of the UE, or in a SIM or USIM module or other removable module such as ISIM, embedded UICC (eUICC) in ETSI SCP or a soft SIM implementation in a Trusted Execution Environment (TrE) also named MCIM.

In this example it can be assumed that the message verification function 204 is initially disabled (by default) to minimize the risk of the user missing any messages. Thus, all messages received by the message verification function are passed through.

At some point in time, an attack against the system is detected whereby falsified messages are sent to the user(s) and there arises a need to enforce authenticity and/or integrity checking of the messages. How the detection of the attack is achieved is not directly relevant to this embodiment, but it will be appreciated that falsified messages can naturally be detected by people who receive the false messages and know that they are false. Radio disturbances in a certain area may also indicate that someone is trying to send false messages. At this point, a configuration function 205 interacts with the user device 201 to perform a verification configuration action to enable policy enforcement in the user's device, leading to blocking of further messages that fail validation of authenticity and/or integrity or other processing of security information. Optionally, the key provisioning could be performed at the same time as the verification configuration action, or any time before that. Various examples for how key provisioning may be carried out are described below.

Figure 3:
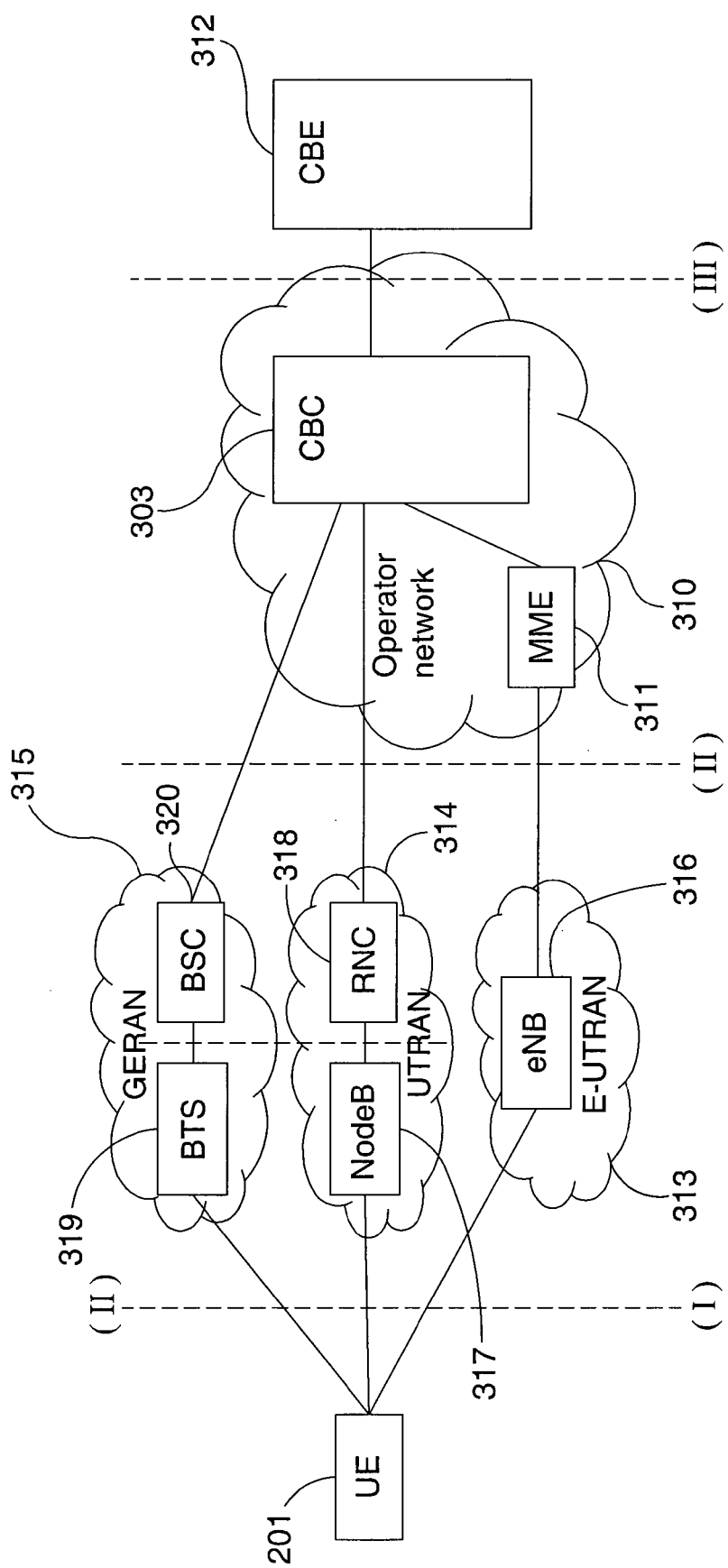
FIG. 3 shows a PWS system architecture.

FIG. 3 is a schematic diagram of a system architecture suitable for providing security for PWS, as specified in document S3-110565. In this example the system is based on the Cell Broadcast System (CBS) defined in TS 23-041, but it will be appreciated that any message broadcast system such as MBMS may also be appropriate. The architecture includes an operator network (serving network) 310 which includes a Cell Broadcast Centre (CBC) 303 and MME 311. A Cell Broadcast Entity (CBE) 312 provides the content of messages to be broadcast to the CBC 303.

In this example, the CBC node 303 implements the PWS Broadcast Message Sender Function 203 shown in FIG. 2. Messages are sent to a UE 201 via an E-UTRAN 313 (containing eNB 316), UTRAN 314 (containing NodeB 317 and RNC 318) or GERAN 315 (containing BTS 319 and BSC 320), for example. The PWS messages are signed with a public key and integrity protected. In one proposal (S3-110394), the public key is provided by the serving network 303 in response to each successful location area, routing area, or tracking area update. If the UE 201 discovers that it is missing the current key, it may also request it from the serving network 303.

Figure 4:
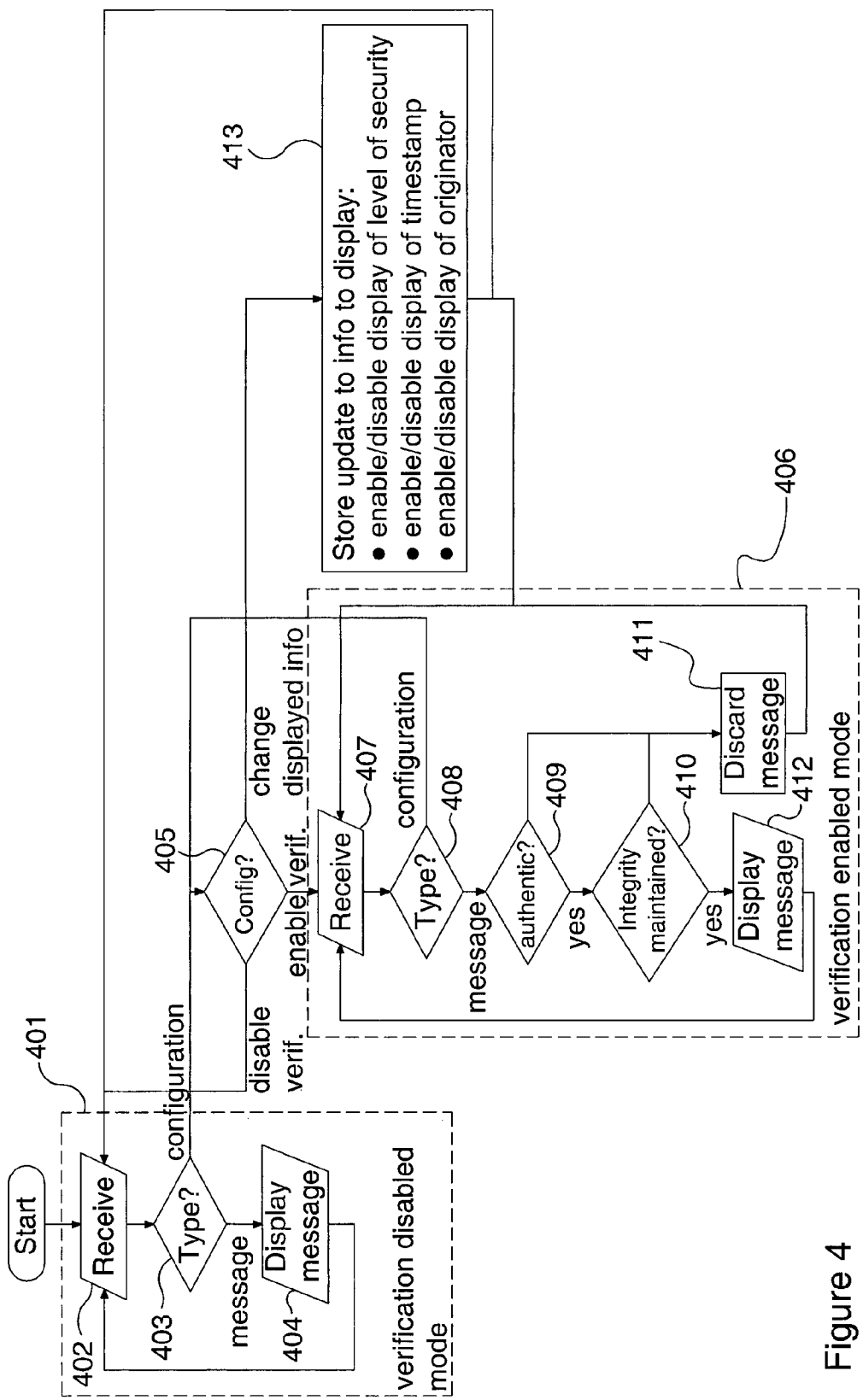
FIG. 4 is a flow diagram illustrating an example of the behaviour of a message verification function at a user device.

FIG. 4 is a flow chart illustrating the behaviour of the message verification function 204 associated with the UE 201. It can be assumed that, by default, message verification is initially disabled and the UE operates in a "verification disabled" mode 401. When a message is received 402 from a serving network, a check is made 403 to see if it is a configuration message. If it is not a configuration message (i.e. it is an information message) it is displayed to the user 404 immediately. It will be appreciated that other forms of notification may be sent to the user, for example an audible notification or a tactile movement. However, for the following discussion, the display of information is described by way of example. In some embodiments it is possible that both an audible and/or tactile notification and a display of information may be employed.

If the message is a configuration message then a check is made 405 to determine what configuration is indicated therein. If the indicated configuration is for verification to be disabled then the verification disabled mode 401 should be maintained and the UE waits to receive the next message 402. If the indicated configuration is that verification should be enabled verification then the UE switches over into "verification enabled" mode 406 and waits to receive the next message 407. It will be appreciated that the configuration message itself should be authenticated to the user. This can be done using any suitable system such as a public key signature.

When a message is received in verification enabled mode, a check 408 is again made to determine whether it is a configuration message. If so, then the configuration indicated is again checked 405 and the UE returned to verification disabled mode 401 or maintained in verification enabled mode 406, depending on the indicated configuration.

If the message is not a configuration message and verification is enabled (i.e. it is an information message containing information to be displayed), then checks are made to authenticate the message 409 and confirm its integrity 410. If either of these checks is failed then the message is discarded 411. If both are passed then the message is displayed 412.

A configuration message may also include instructions to change the information displayed to the user in all future messages. When the configuration message is checked for information 405, stored update information is amended 413 in the UE to enable or disable display of various parameters such as the level of security, timestamp or originator of the message. These can be set regardless of the current mode of the UE.

Figure 5:
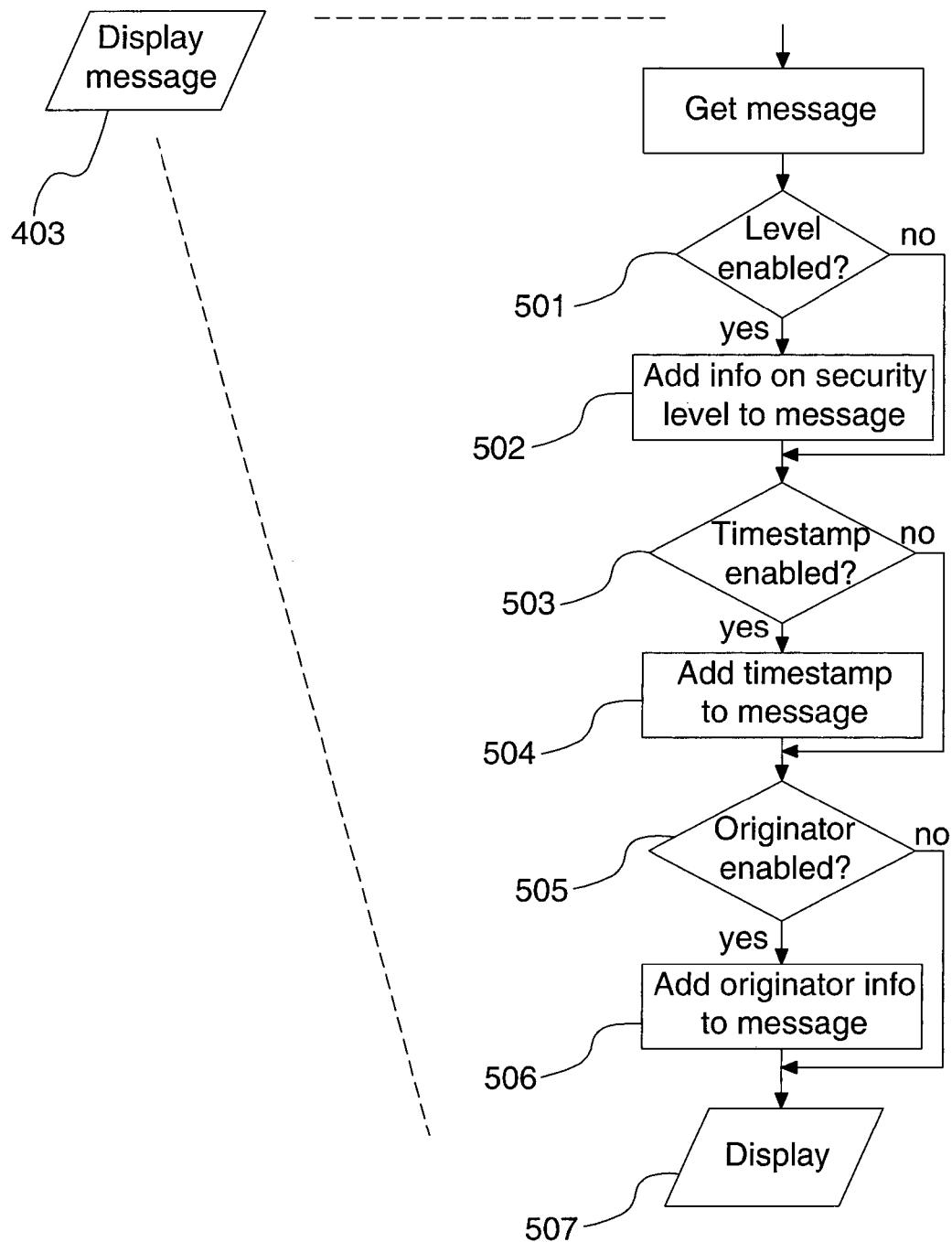
FIG. 5 is a flow diagram illustrating the display of a message by a user device.

FIG. 5 is a flow chart illustrating how the display message functions 404, 412 operate, depending on the update information stored in the UE. If security level 501 is enabled it is added to the message content 502; if timestamp 503 is enabled then it is added to the message content 504; if the originator is enabled 505 then this information is added to the message content 506. The message, now possibly including the additional security-related content, is then displayed 507.

Figure 6:
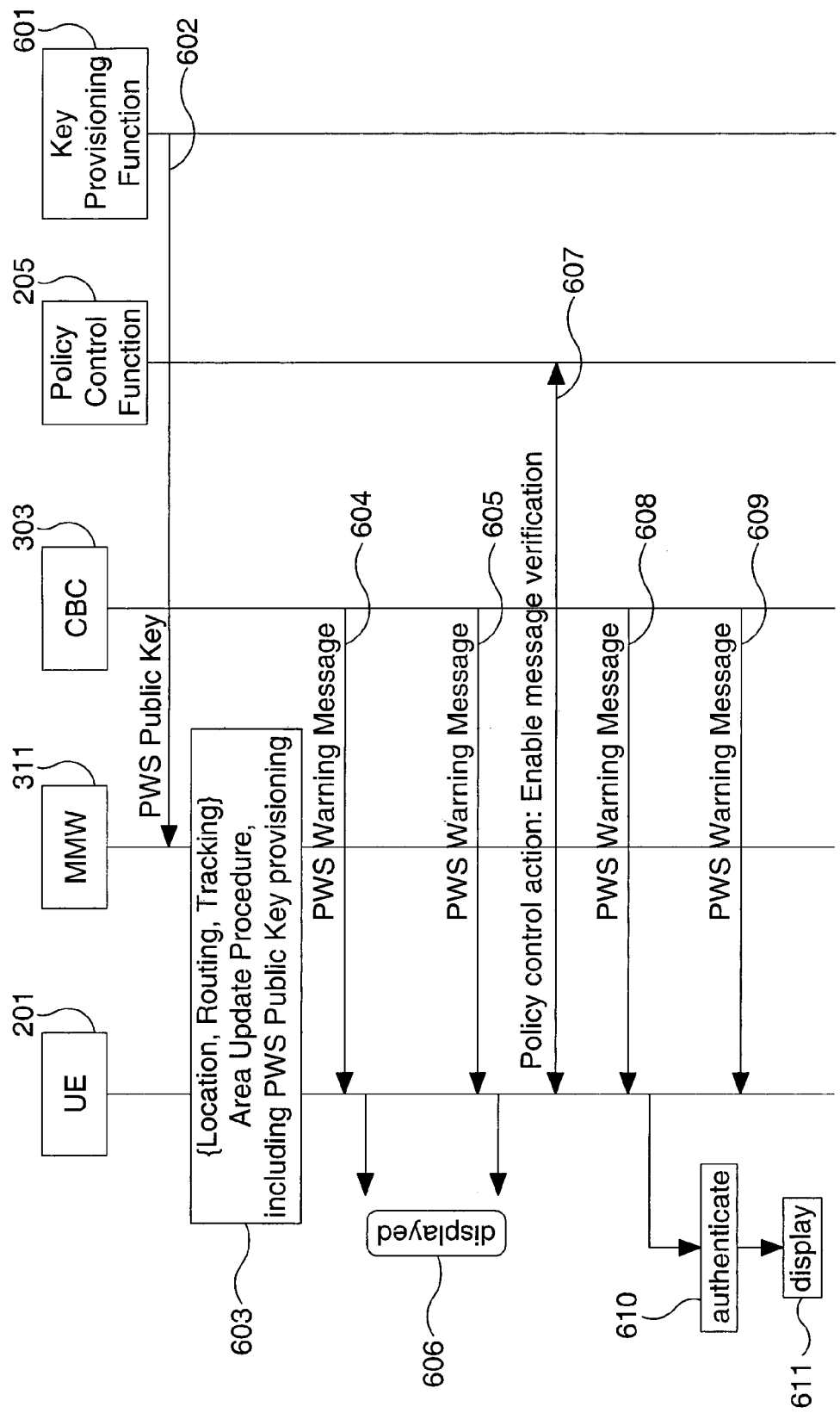
FIG. 6 is a signalling diagram illustrating suitable signalling flow implementing the process flow of FIGS. 4 and 5.

An example of signalling flow for this embodiment is shown in FIG. 6. In this example a key provisioning function 601 (e.g. in the operator network 310) provisions the MME 311 with a public key for the PWS service 602. When the UE 201 registers with the operator network (including via location, routing, tracking services) it carries out an Area Update Procedure. The PWS public key is provided to the UE 201 as part of this procedure 603. As discussed above, it is initially assumed that the UE 201 is in "verification disabled" mode. Therefore whenever a PWS warning service 604, 605 is sent from the CBC 303 to the UE 201, it is displayed immediately 606.

When the decision is made to enable message verification, a configuration message 607 is sent from the policy control function 205 to the UE 201. Subsequent PWS warning messages 608, 609 are then authenticated 610 by the UE before they are displayed 611.

It will be appreciated that the approach can also be used to switch UEs to a configuration in which they no longer process authentication information (as shown in FIG. 4). This can be useful if it turns out that a large set of devices turns out to be incorrectly implemented and discard valid warning messages.

It will be noted that the first actions 602, 603 shown in FIG. 6 result in key provisioning to the UE 201. It will be appreciated that key provisioning could alternatively be performed at a later time, or even as part of the verification configuration action 607. Key provisioning could be performed by different functions or nodes, such as for example the MME, ANDSF (Access Network Discovery and Selection Function) server, or eNB. Other suitable nodes will also be apparent to one skilled in the art.

Figure 7:
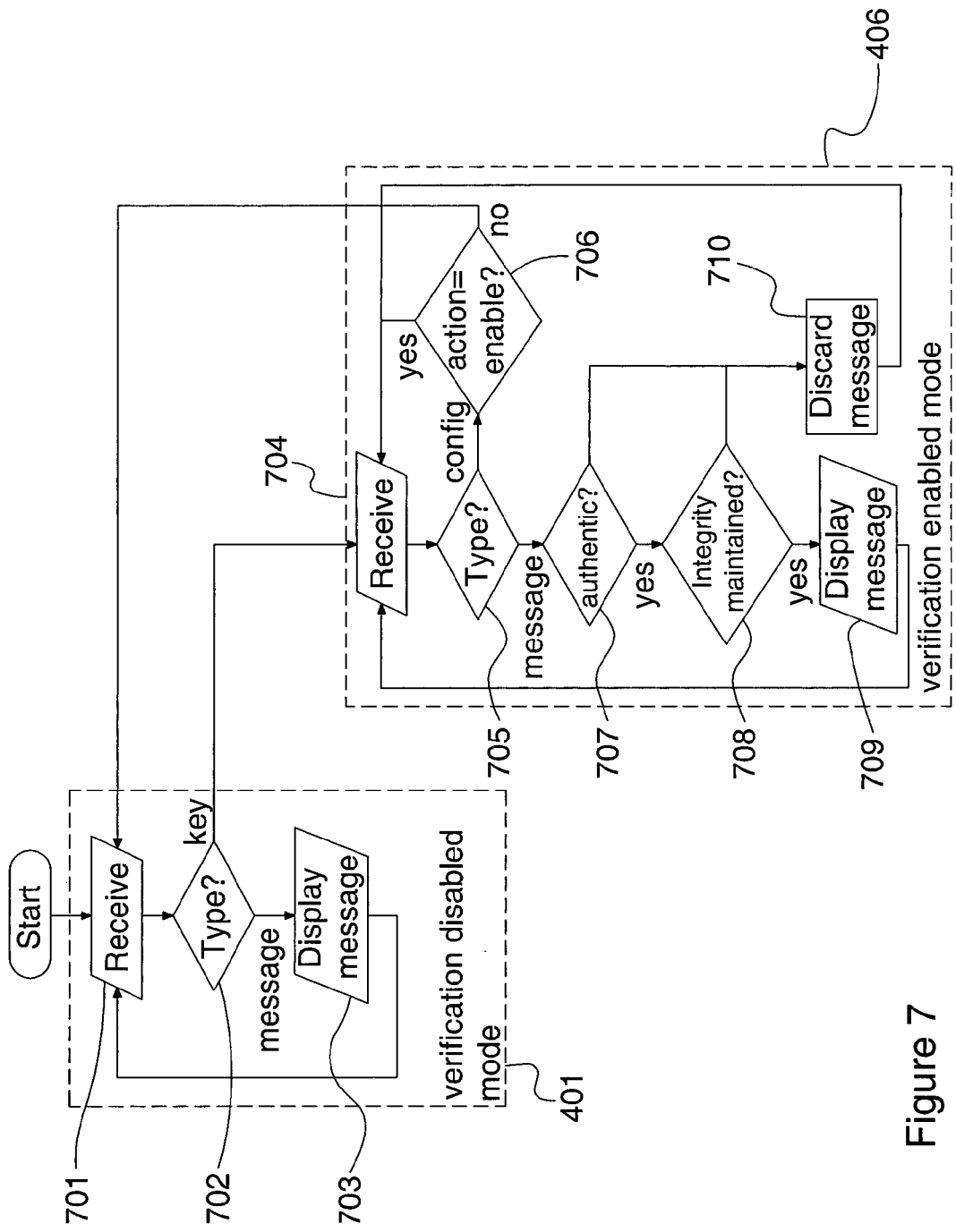
FIG. 7 is a flow chart illustrating exemplary behaviour of a message verification function when configuration is updated in response to receipt of a key.

One possibility is for key provisioning to cause the message verification function 204 in the UE 201 to enable verification—i.e., the key provisioning itself is effectively the verification configuration action. This can be understood with reference to FIG. 7.

As before, the verification function 204 is initially in verification disabled mode. When a message is received 701, it is checked 702 to see whether it is a key provisioning message or information message. If it is an information message, it is displayed to the user 703 as before.

If it is a key provisioning message the key is saved at the UE 201, and the verification function 204 is switched to verification enabled mode. Subsequent incoming messages 704 are checked 705 to see if they are configuration messages. If they are configuration messages and they contain an indication that verification should not be implemented 706 then the verification function 204 is returned to verification disabled mode. If a message contains information for display then it is authenticated 707 and its integrity checked 708 before being displayed 709 or discarded 710 as before.

There may be a number of reasons why the handling of authenticity information in PWS messages may need to change. For example, if an attack has been detected, this may make it necessary to verify the authenticity of messages. It could be that a new authentication scheme has been deployed in the network and been verified to interoperate with the user devices, making risks associated with lost warning messages insignificant. Or it could be a change in handling, such as enabling display of security information related to messages.

Several options exist for enabling delivery of the configuration details to the message verification function 204.

In one option, the configuration details could be delivered to the UE 201 by an element in the core network (e.g. MME, MSC or SGSN) using Non-Access Stratum (NAS) protocols. A new optional information element (IE) could be added in the NAS protocol to any NAS procedure from the network towards the UE. Suitable examples include Attach Accept, Routing Area Update Accept, Location Update Accept, Tracking Area Update Accept, Security Mode Command.

Figure 8:
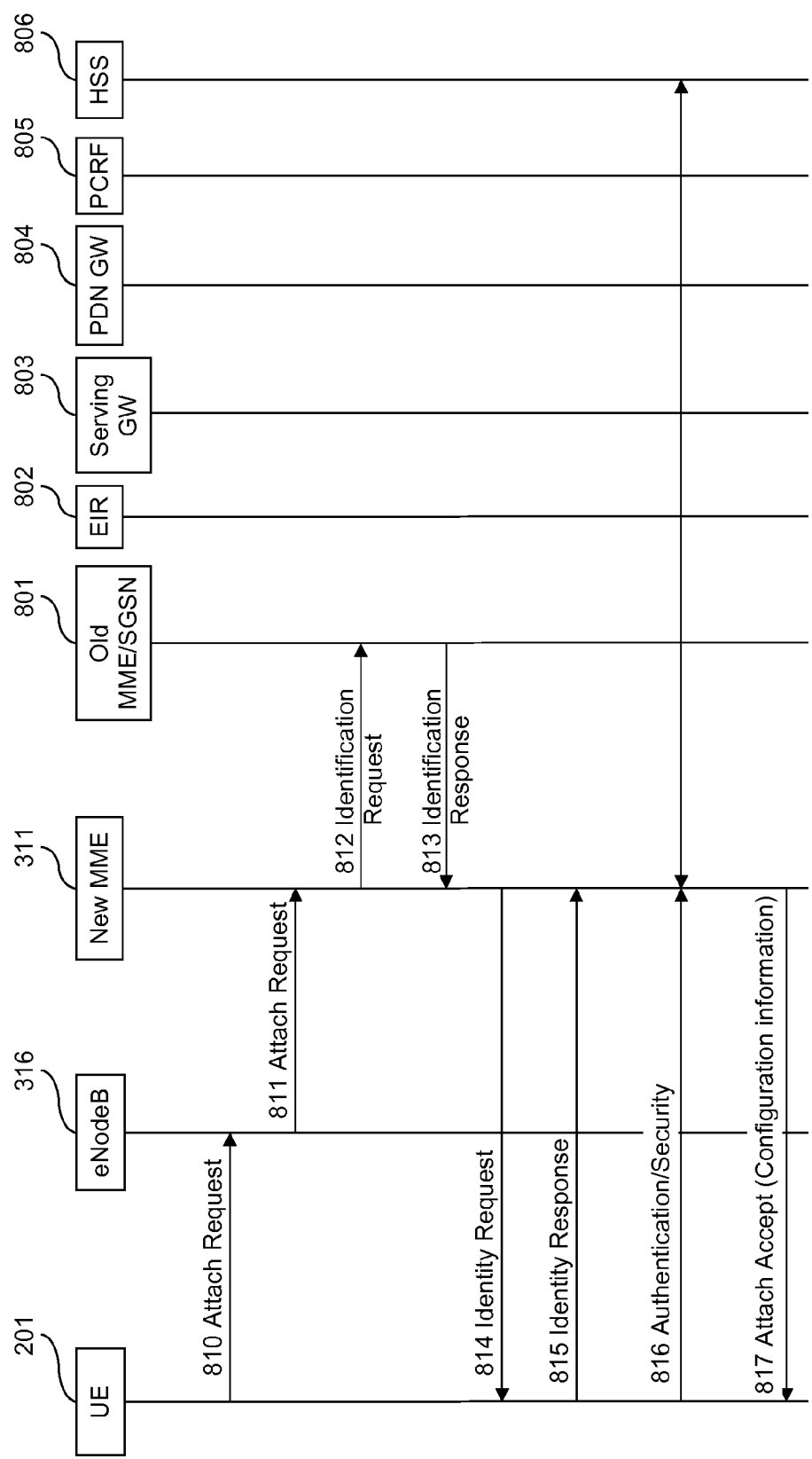
FIG. 8 is a signalling diagram showing delivery of configuration information by a core network.

FIG. 8 illustrates one example of such a delivery mechanism. The figure is a signalling diagram for an attachment procedure to an MME handover in a system containing a UE 201, eNodeB 316, MME 801, EIR 802, Serving GW and PDN GW 803, 804, PCRF 805 and HSS 806, where the UE 201 has previously been attached to an old MME 801. An Attach Request 810 is sent from the UE 201 to the eNodeB 316, and this is forwarded 811 to the new MME 311. The new MME 311 sends an Identification Request 812 to the old MME 801, which returns an identification response 813. The new MME sends an Identity Request 814 to the UE 201, which returns an Identity Response 815. The UE 201 and new MME 311 are then authenticated 816 to each other, using authentication information provided by the HSS 806. Once the authentication procedure is complete, the new MME 311 sends an Attach Accept message 817 to the UE 201, and it is this Attach Accept message that contains an IE including the configuration details for use by the verification function 204 of the UE 201. This approach also makes it possible to deliver the configuration to roaming users.

Another option is to deliver the configuration details by the Radio Access Layer (known as the RRC layer in an eNodeB). Using this approach, at RRC connection establishment, the RRC layer in the eNode B inserts configuration details for the selected MME node into a RRCConnectionSetup message sent to the UE. Alternatively, the RRC layer may insert the new configuration into some other message from the network to the UE. This again makes it possible to deliver the configuration to roaming users.

A further option is for the UE may initiate communication, e.g. using an IP-tunnel, with an ANDSF (Access Network Discovery and Selection Function) server for operator preferred access network discovery. After communicating with the ANDSF, the UE may be provided with updated inter-system policy and information about available access networks in the vicinity of the UE. Configuration details could also be provided by the ANDSF to the UE. Even when the UE is roaming in a visited PLMN, it would be possible for the UE to use DNS lookup to discover the IP address of V-ANDSF in order to access the ANDSF in a visited PLMN, as explained in TS 24.302.

Another option is that the configuration is delivered to the UE 201 by the CBC 303.

Figure 9:
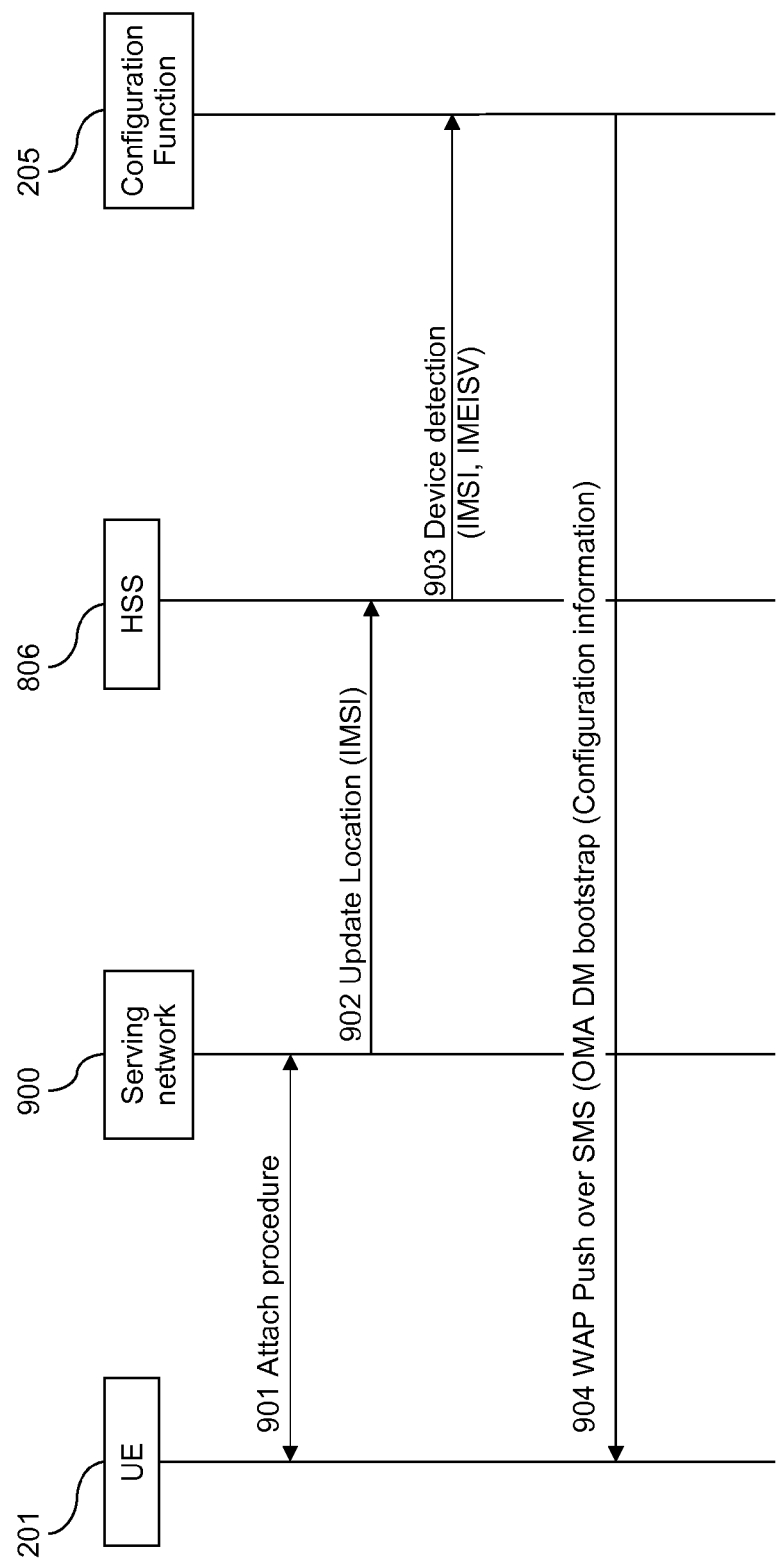
FIG. 9 is a signalling diagram showing delivery of configuration information by a push method.

A further option is for the configuration details to be passed to the UE using a "push" method as shown in FIG. 9. When the UE 201 contacts a serving network 900 with a procedure 901 such as an Attach procedure, Location Update procedure, Routing Area Update procedure or Tracking Area Update procedure, the serving network 900 forwards an Update Location message 902 or similar to the HLR/HSS 806. The HLR/HSS 806 then triggers 903 the Configuration Function 205 to send the configuration details to the UE in an OMA OM bootstrap message in a WAP Push message 904 using SMS. Even GBA Push would be even more secure to use in the push method, as described in TS 33.223 and TS 33.224. This approach makes it possible to deliver the configuration information to roaming users. The serving network 900 may be a home network or a visited network.

Figure 10:
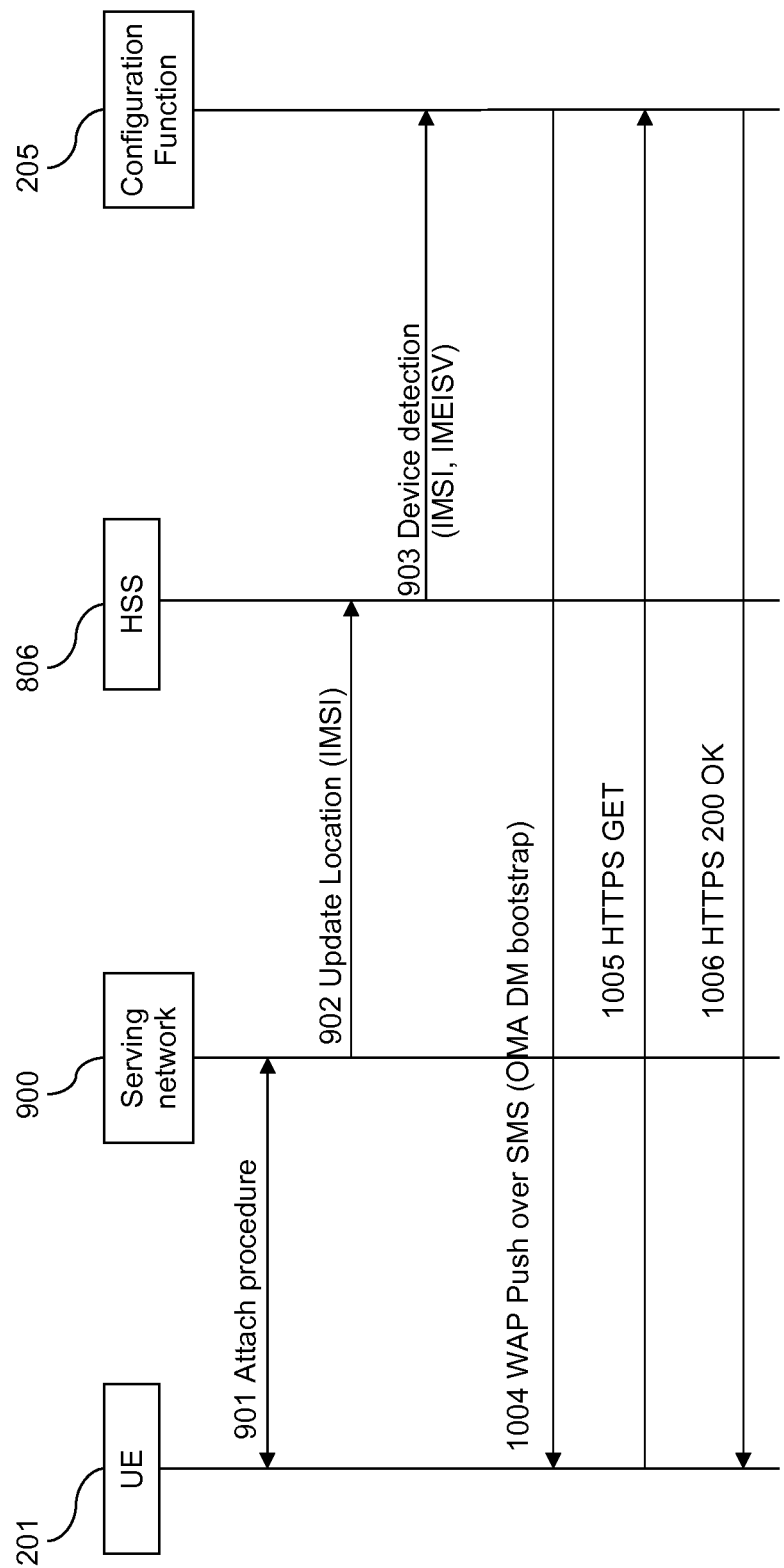
FIG. 10 is a signalling diagram showing delivery by a pull method.

A different approach would be to deliver the configuration information by a "pull" method, as shown in FIG. 10. When the UE 201 contacts a serving network 900 with a procedure 901 such as an Attach procedure, Location Update, procedure, Routing Area Update procedure or Tracking Area Update procedure, the HLR/HSS 806 causes the Configuration Function 205 to send the UE 1004 an OMA DM bootstrap message in a WAP Push message using SMS. This triggers the UE 201 to contact the network server in which the Configuration Function 205 resides via IP connectivity 1005 and retrieve (pull) the verification configuration from the Configuration Function over a secured HTTPS link 1006.

The UE could also be preconfigured by the home operator with the IP address of the network server in which the Configuration Function resides.

In a yet further option, the configuration could be delivered to the USIM via the device using the OTA protocol from the OTA system. If the security authentication information is verified by the ME of the UE, then the ME has to retrieve the configuration from the USIM.

Figure 11:
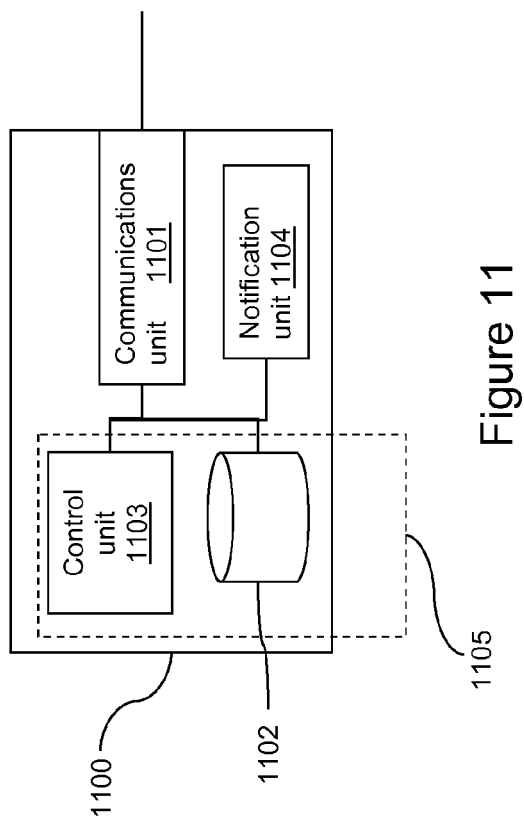
FIG. 11 is a schematic illustration of the architecture of a user device for communicating with a network.

FIG. 11 is a schematic illustration of the structure of a user device 1100 for use in a network. The user device is suitable for use as the devices 101, 201 described above. The device includes a communications unit 1101 for exchanging data with other entities in the network, a storage unit 1102 for storing data, a control unit 1103 and a notification unit 1104 for conveying a notification to a user. The notification unit 1104 may include a display device. The storage unit 1102 may be configured to store keys used to authenticate information messages, and/or to store the configuration in which the device is operating at any given time. It will be appreciated that keys and the configuration need not be kept in the same storage unit. The storage unit 1102 and/or control unit 1103 may be incorporated into the ME, or may be incorporated into a removable module 1105 such as SIM or USIM. Other examples of removable modules include ISIM (TS 31.103 v.10.1.0), an embedded UICC (eUICC) in ETSI SCP (Draft ETSI TS 103 383 v0.0.3 or SCPREQ(11) 0072R11_Draft_Embedded_UICC_Requirements_Specification) or a soft SIM implementation in a Trusted Execution Environment (TrE) also named MCIM (TR 33.812 v.9.2.0), or CSIM in 3GPP2.

Figure 12:
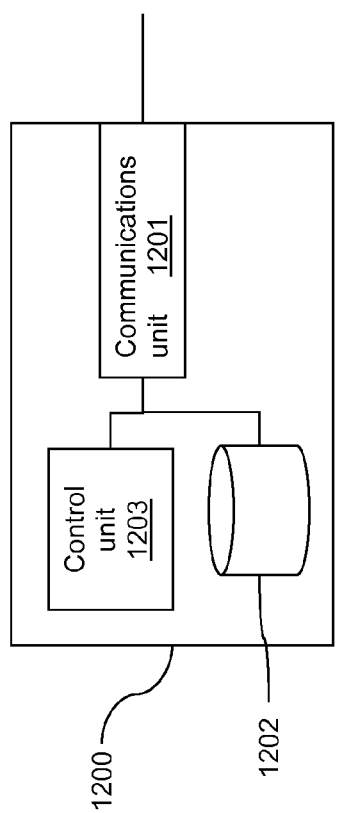
FIG. 12 is a schematic illustration of the architecture of a serving node for use in a network.

FIG. 12 is a schematic illustration of a serving node 1200 suitable for providing a configuration function 103, 205. The serving node comprises a communications unit 1201 for exchanging data with other entities in the network, a storage unit 1202 and a control unit 1203.

The systems described above reduce the risk of messages being erroneously blocked by verification (for example as a result of technical errors in key provisioning or in the transmission leading to erroneously failed verification). In particular there may be cases where a system is deployed while the authenticity and integrity information has not yet been fully specified. In such a case, the approach described avoids performing any verification action until a need has clearly developed, to avoid misinterpreting spurious content in authenticity and integrity fields.

Moreover, the system addresses the practical problems resulting from deployment of only partially specified features, as in the case of PWS message authentication.

Thus, for messages of very high importance, as in the case of the PWS, it becomes possible to be able to control the use of message verification during system operation, for example, such that verification is only required if there is a significant threat against the system—such as when an attack has been detected previously.

It is also possible to use at least one of the embodiments described herein to switch UEs to a configuration in which they no longer process the authentication information. This can be useful if it turns out that a large set of devices turns out to be incorrectly implemented and discards valid warning messages, for example.

The invention claimed is:

1. A device for communicating with a network, the device comprising:
   a communications circuit for receiving data;
   a notification circuit for conveying a notification to a user; and
   a control circuit for controlling operation of the communications circuit and the notification circuit;
   wherein:
   the communications circuit is configured to receive both an information message and security authentication data associated with the information message, wherein the information message includes the notification;
   the control circuit is configured to selectively operate in a first configuration in which the control circuit ignores the security authentication data, and instructs the notification circuit to convey the notification to the user without using the security authentication data to verify the information message, and a second configuration in which the control circuit verifies the information message based on the security authentication data and instructs the notification circuit to convey the notification to the user responsive to a determination that the verification is successful; and
   the communications circuit is configured to receive a configuration message comprising an indicated configuration that indicates whether the control circuit should operate in the first configuration or the second configuration; and the control circuit is configured to change configuration responsive to a determination that the indicated configuration is different than a current configuration.

2. The device of claim 1, wherein the control circuit is configured to operate in the first configuration in one or more of the following situations:
   when the device is switched on for the first time;
   when the device roams to a new network;
   when the device has been configured via a second configuration message that indicates that the device should operate in the first configuration; and following an interruption to communication;
and wherein the control circuit is further configured to switch to the second configuration upon reception of a third configuration message that indicates that the control circuit should operate in the second configuration.

3. The device of claim 1, wherein the configuration of the control circuit is stored in a configuration storage circuit associated with the device.

4. The device of claim 3, wherein the configuration storage circuit or a key storage circuit, or both, are included in a removable entity.

5. The device of claim 4, wherein the removable entity is capable of performing processing of the parts of GSM-AKA, UMTS-AKA or EPS-AKA that is performed by a SIM or USIM module.

6. The device of claim 1, wherein the communications circuit is configured to receive one or more keys, wherein a key storage circuit associated with the device is configured to store the one or more keys, and wherein the control circuit is configured to use at least one of the one or more keys to verify the information message.

7. The device of claim 6, wherein the one or more keys are one or more public keys.

8. The device of claim 1, wherein the notification circuit comprises a display device, configured in such a way that conveying the notification to the user comprises displaying information contained in the information message.

9. The device of claim 8, wherein the configuration message further includes an indication of security information that should be displayed to the user, and wherein the control circuit is configured to, when the information message is received, instruct the display device to display the security information to the user along with the information in the information message dependent upon the indication in the configuration message.

10. The device of claim 1, wherein the information message is a Public Warning System message.

11. The device of claim 1, wherein the control circuit is configured to authenticate the configuration message.

12. A serving node for use in a telecommunications network, comprising:
a communications circuit for sending data;
a storage medium for storing data; and
a control circuit for controlling the operation of the communications circuit and the storage medium;
wherein:
the communications circuit is configured to send a configuration message to a user device in the telecommunications network, the configuration message including an indication as to whether the user device should operate in a first configuration in which the user device receives a first information message and associated first security authentication data and, subsequently, conveys a first notification included in the first information message to a user without using the first security authentication data to verify the first information message, or a second configuration in which the user device receives a second information message and associated second security authentication data and, subsequently, verifies the second information message based upon the second security authentication data and, responsive to a successful verification, conveys a second notification included in the second information message to the user.

13. The serving node of claim 12, wherein the configuration message further includes an indication of security information that should be displayed to the user.

14. The serving node of claim 12, wherein the information message is a Public Warning System message.

15. A method for activating the use of security authentication data in a user device in a telecommunications network, the method comprising:
receiving a configuration message comprising a configuration indication;
selectively setting the user device to operate in a first configuration or a second configuration, on the basis of the configuration indication, such that the user device, when operating in the first configuration, receives a first information message and associated first security authentication data and processes the first information message without using the first security authentication data to verify the first information message and, when operating in the second configuration, receives a second information message and associated second security authentication data associated with the second information message and verifies the second information message based on the second security authentication data before processing the second information message.

16. A method for operating a user device in a telecommunications network, the method comprising:
receiving both an information message and security authentication data associated with the information message, the information message including a notification;
processing the information message dependent upon whether the user device is configured in a first configuration or a second configuration, such that, in the first configuration, the security authentication data is ignored and the notification is conveyed to a user without using the security authentication data to verify the information message, and, in the second configuration, the information message is verified based on the security authentication data and the notification is conveyed to the user responsive to a determination that the verification is successful;
receiving a configuration message comprising an indicated configuration that indicates whether the user device should operate in the first configuration or the second configuration; and
changing configuration responsive to a determination that the indicated configuration is different than a current configuration.

17. A method for operating a serving node in a telecommunications network, the method comprising:
sending a configuration message to a user device in the telecommunications network, wherein the user device is configured to receive information messages, each of which has associated security authentication data that is also received by the user device, and wherein the configuration message includes an indication as to whether the user device should operate in a first configuration in which the user device receives a first information message and associated first security authentication data and, subsequently, conveys a first notification included in the first information message to a user without using the first security authentication data to verify the first information message, or a second configuration in which the user device receives a second information message and associated second security authentication data and, subsequently, verifies the second information message based upon the second security authentication data and, responsive to a successful verification, conveys a second notification included in the second information message to the user.

18. A non-transitory computer-readable medium comprising, stored thereupon, code adapted to be executed on a device in a telecommunications network, wherein the code, when executed by the device, is operable to cause the device to:
  receive both an information message and security authentication data associated with the information message, the information message including a notification;
  process the information message dependent upon whether the device is configured in a first configuration or a second configuration, such that, in the first configuration, the security authentication data is ignored and the notification is conveyed to a user without using the security authentication data to verify the information message, and, in the second configuration, the information message is verified based upon the security authentication data and the notification is conveyed to the user responsive to a determination that the verification is successful;
  receive a configuration message comprising an indicated configuration that indicates whether the device should operate in the first configuration or the second configuration; and
  change configuration responsive to a determination that the indicated configuration is different than a current configuration.

19. A non-transitory computer-readable medium comprising, stored thereupon, code adapted to be executed on a serving node in a telecommunications network, wherein the code, when executed on the serving node, is operable to cause the serving node to send a configuration message to a user device in the telecommunications network, the configuration message including an indication as to whether the user device should operate in a first configuration in which the user device receives a first information message and associated first security authentication data and, subsequently, conveys a first notification included in the first information message to a user without using the first security authentication data to verify the first information message, or a second configuration in which the user device receives a second information message and associated second security authentication data and, subsequently, verifies the second information message based upon the second security authentication data and, responsive to a successful verification, conveys a second notification included in the second information message to the user.

* * * * *